United States Patent
Waddles

[19]

[11] Patent Number: 6,026,586
[45] Date of Patent: Feb. 22, 2000

[54] POWDER COATING THICKNESS GAUGE

[75] Inventor: Charles Edward Waddles, Plymouth, Ohio

[73] Assignee: Defelsko Corporation, Ogdensburn, N.Y.

[21] Appl. No.: 08/987,008

[22] Filed: Dec. 8, 1997

[51] Int. Cl.[7] .................................................. G01B 5/06
[52] U.S. Cl. .............................. 33/834; 33/833; 33/832; 33/1 H
[58] Field of Search .............................. 33/834, 833, 832, 33/1 H

[56] References Cited

U.S. PATENT DOCUMENTS

| | | |
|---|---|---|
| 1,909,652 | 5/1933 | Bower . |
| 2,814,122 | 11/1957 | Euverard . |
| 2,839,835 | 6/1958 | Zollinger . |
| 3,093,908 | 6/1963 | Rabinow .................................. 33/834 |
| 3,128,558 | 4/1964 | Euverard . |
| 3,423,837 | 1/1969 | Euverard . |
| 3,758,957 | 9/1973 | Eskijian .................................. 33/834 |
| 4,169,319 | 10/1979 | Gardner . |
| 4,235,018 | 11/1980 | Säberg . |
| 4,377,037 | 3/1983 | Taylor .................................... 33/834 |
| 4,776,099 | 10/1988 | Euverard . |
| 5,335,424 | 8/1994 | Spangler ................................ 33/834 |
| 5,450,678 | 9/1995 | Check . |

FOREIGN PATENT DOCUMENTS

| | | |
|---|---|---|
| 60-127401 | 7/1985 | Japan . |
| 61-100601 | 5/1986 | Japan . |

*Primary Examiner*—Christopher W. Fulton
*Assistant Examiner*—Quyen Doan
*Attorney, Agent, or Firm*—Burns, Doane, Swecker & Mathis LLP

[57] ABSTRACT

A detector for measuring a thickness of a powder on a surface includes a body; a device extending from the body for facilitating holding the body on the surface; and a plurality of teeth extending from the body and spaced from each other along the plane, each of the teeth being defined by two walls extending from the body so as to form a distinct line of intersection extending perpendicular to the plane at a point remote from the body, each of the teeth being of a different length. A method of detecting a thickness of a layer of powder on a surface includes the steps of placing the detector on the surface such that the detector extends substantially perpendicularly to the surface; sliding the detector along the surface in a direction that is perpendicular to the plane of the body for a distance that is greater than a thickness of the body; examining the layer of powder on the surface in a location over which the detector was slid; identifying which, if any, of the teeth made an imprint in the powder; and determining the thickness of the layer by the unique distance of the teeth that made an imprint in the powder.

21 Claims, 1 Drawing Sheet

POWDER COATING THICKNESS GAUGE

BACKGROUND OF THE INVENTION

1. Field of the Invention

The present invention relates to a method and apparatus for detecting a thickness of a layer of powder on a surface.

2. Description of Related Art

There are many devices for detecting the thickness of a layer of material on a surface. However, many of these detectors are not satisfactory for measuring the thickness of a layer of a powder material.

For example, U.S. Pat. No. 1,909,652, issued to Bower, discloses a glazing thickness gauge that includes broad teeth 11 at each end thereof. As can be seen in FIG. 3, each of the broad teeth 11 are tapered at the tip thereof so as to form a point. In view of the fact that the supporting teeth 11 are at a point and not at a flat surface, the disclosed gauge may not necessarily be held perpendicular to the surface on which the layer is being measured. If the gauge is not reasonably perpendicular to the surface, the accuracy of the measurement will be jeopardized. In addition, the measuring blades 16, 17, are relatively broad in width. Accordingly, if the blades 16, 17, contact a powder material on the surface being measured, the blades 16, 17, will tend to plow the powder off to one side of the blades. As a result of this plowing effect, powder moved by one of the blades 16, 17, may spill over into the path of the other of the blades 16, 17, thus creating an inaccurate measurement. Thus, it can be seen that the Bower device is not satisfactory for accurately measuring the thickness of a powder layer.

Other devices, such as those disclosed by Japanese Laid-Open Patent Application Nos. 61-100601 and 60-127401, disclose measuring devices having broad measuring blades which would create the spill over affect discussed above with respect to the Bower device.

There are also several devices that have been disclosed that utilize rollers for measuring the thickness of deposits. One such device is disclosed in U.S. Pat. No. 2,839,835, issued to Zollinger. However, such roller devices do not result in accurate measurements because they either skid on the powder or they ride up on the powder surface like a boat hull, thus jeopardizing the accuracy of the measurements. In addition, the roller type devices are relatively bulky and are not convenient to carry.

OBJECTS AND SUMMARY

It is an object of the present invention to overcome the deficiencies of the prior art devices by providing a method and apparatus for detecting a thickness of a layer of a powder on a surface that is easy to use and carry, and which results in an accurate measurement.

It is another object of the present invention to provide a detector for detecting the thickness of a layer of a powder on a surface that includes teeth which are substantially spaced from each other such that interaction with a particular tooth and the powder does not interfere with the interaction of any other teeth and the powder.

It is still another object of the present invention to provide a detector for measuring a thickness of a powder on a surface that includes means for enabling the detector to be placed on the surface such that dependable and repeatable measurements can be made.

It is still yet another object of the present invention to provide a method and detector for measuring a thickness of a powder on a surface, wherein the measurements can be verified.

The present invention includes a detector for measuring a thickness of a powder on a surface that includes a body having a bottom edge, two feet extending from the bottom edge of the body, wherein each of the feet includes a flat bottom for supporting the body on the surface in a direction that is predetermined with respect to the surface, wherein the flat bottom of both feet reside in the same plane. The detector further includes a plurality of teeth extending from the bottom edge of the body, wherein each of the teeth forms a point at its distal end, and wherein the point of each tooth ends at a different distance from the plane in which the flat bottoms of the feet reside.

The present invention also relates to a detector for measuring a thickness of a powder on a surface that includes a body, and means extending from the body for facilitating holding the body on the surface such that the body extends in a plane that is substantially perpendicular to the surface.

The detector further includes a plurality of teeth extending from the body and spaced from each other along the plane, wherein each of the teeth are defined by two walls extending from the body. The walls converge towards each other as they extend from the body so as to form a plane at a point remote from the body. Each of the teeth is of a different length such that the line of intersection of each tooth is a unique distance from the surface when the body is held against the surface using the facilitating means.

The present invention also relates to a method of detecting a thickness of a layer of powder on a surface comprising the steps of placing a detector on the surface such that the detector extends substantially perpendicular to the surface and sliding the detector along the surface in a direction that is perpendicular to the plane of the body for a distance that is greater than a thickness of the body. After the detector has been slid along the surface, the layer of powder on the surface is examined in the location over which the detector was slid. The layer of powder is examined to identify which, if any of the teeth made an imprint in the powder. The thickness of the layer of the powder is then determined by seeing which teeth made an imprint in the powder.

DETAILED DESCRIPTION OF THE PREFERRED EMBODIMENTS

Figure 1:
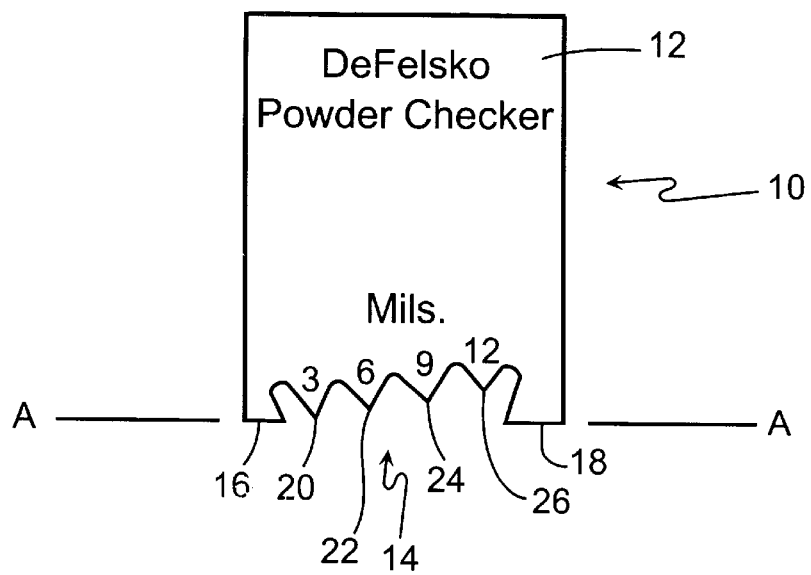
FIG. 1 is a side elevational view of the detector according to the present invention.

The present invention relates to a method and device for detecting or measuring a thickness of a layer of powder on a surface. Although the present invention may be used to measure the thickness of many different types of powder, or even other substances, in one embodiment of the present invention, the powder being measured is a heat fusible, finely divided, solid, resinous material used to form electrical insulating coatings. The coating powder may contain fillers, colorants, curing agents, etc., consistent with producing the desired coating. The powders may be applied by various methods, such as spraying, sprinkling, or dipping. After a surface is coated with such a coating powder, the surface and powder are heated, which causes the powder to melt and flow into a dense coating.

Many coating properties are affected by the thickness of the cured dried powder. Such properties includes adhesion, flexibility, and hardness. In order to determine, or verify, the qualities of the coating, it is preferable to measure the thickness of the coating.

It is found to be preferable to measure the powder coating prior to its melting and curing, rather than measuring the thickness of the final coating. Measurement of the dry powder thickness at the time of application is most appropriate as it permits correction and adjustment of the powder by the applicator at the time of the application. Correction of the powder after it has been cured, may require costly labor, increased cost to strip and recoat, and may introduce problems of adhesion and integrity of the coating system. Since many powder coating lines are long, many valuable parts may be lost by the time a cured thickness determination has been made.

Although the thickness of the coating may be different after it is cured than while it is still in powder form, there is frequently a direct relationship between the dry powder thickness and the final cured coating thickness. The dry powder/cured coating thickness ratio is influenced by the size and type of powder particles.

According to the present invention, a detector 10 for measuring a thickness of a powder on a surface includes a body 12. The body 12 may be of any substantially rigid material. However, it is preferable to use a metal, such as aluminum. The use of metal ensures that the gauge 10 is of sufficient strength. In addition, the use of a metal, such as aluminum, may facilitate the use of an electrostatic attraction between the powder and the gauge 10 so that powder residue may adhere to the gauge 10 if the gauge 10 comes in contact with the powder. The significance of the electrostatic attraction will be explained hereinbelow.

The specific shape of the gauge 10 is not critical to the invention. However, the gauge 10 of the preferred embodiment is substantially rectangular, and has a height of about 1¾ inches, a width of about ½ inches and a thickness of about ⅛ of an inch. However, the present invention is not limited to a gauge of these dimensions.

The gauge 10 has a bottom edge 14. At each side of the bottom edge 14 are feet 16, 18. As can be seen FIGS. 1 and 2, each of the feet 16, 18, has a flat bottom surface. The flat bottom surfaces of both feet 16, 18, reside in the same plane A, which is perpendicular to the plane in which the body 12 of the gauge 10 generally extends. The flat bottom surfaces of the feet 16, 18 enable the gauge 10 to be held in a direction that is substantially perpendicular to a surface on which the powder layer to be measured resides.

Figure 2:
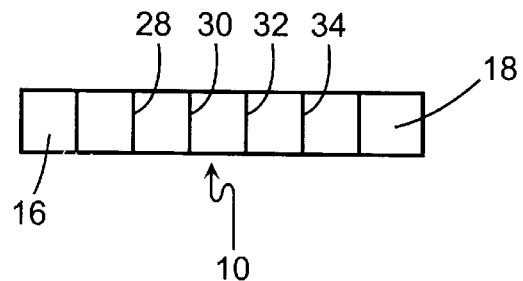
FIG. 2 is a bottom plane view of the detector illustrated in FIG. 1.
Figure 3:
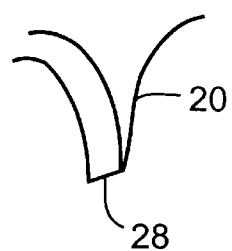
FIG. 3 is a perspective view of a tooth on the detector of FIG. 1.

Extending along the bottom edge 14 of the gauge 10 are a plurality of teeth 20, 22, 24, 26. Each of the teeth, 20, 22, 24, 26 are blade-like in that the tip of the tooth forms a knife-like point or edge 28, 30, 32, 34, as can be seen in FIGS. 1–3. The edge 28, 30, 32, 34 of each tooth 20, 22, 24, 26 extends in a direction that is substantially perpendicular to the plane in which the body 12 of the gauge 10 resides. As an alternative to the knife-like edge illustrated in FIG. 3, the teeth may have a slightly rounded edge at the distal end.

The teeth 20, 22, 24, 26 are preferably spaced from each other a sufficient distance so that powder deflected or attracted to a particular tooth does not affect the interaction of any of the other teeth with the powder. In particular, it is preferable that powder deflected from one tooth during the measuring process does not touch or contact any of the other teeth.

Each of the teeth 20, 22, 24, 26 are of a different length from each other. Specifically, the edge 28, 30, 32, 34 of each respective tooth 20, 22, 24, 26 is a unique distance from the plane A that extends through the bottom surfaces of the feet 16, 18.

In a preferred embodiment, the edge 28 of the tooth 20 is 3 mils from the plane A, the edge 30 of the tooth 22 is 6 mils from the plane A, the edge 32 from the tooth 24 is 9 mils from the plane A, and the edge 34 of the tooth 26 is 12 mils from the plane A. Of course, other tooth lengths and distances from the plane A may be utilized in accordance with the concepts of the present invention. For example, in an alternative embodiment of the present invention, the distances of the teeth edges from the plane A may be expressed in microns. The following table identifies six different embodiments by defining the distance between the plane A and the edge of each tooth:

| Embodiment | Tooth 20 | Tooth 22 | Tooth 24 | Tooth 26 |
|---|---|---|---|---|
| Model 1 | 3 mils | 6 mils | 9 mils | 12 mils |
| Model 2 | 10 mils | 15 mils | 20 mils | 25 mils |
| Model 3 | 20 mils | 30 mils | 40 mils | 50 mils |
| Model 4 | 75 μm | 150 μm | 225 μm | 300 μm |
| Model 5 | 250 μm | 375 μm | 500 μm | 625 μm |
| Model 6 | 500 μm | 750 μm | 1000 μm | 1250 μm |

In other embodiments contemplated by this invention, there may be a fewer or greater number of teeth.

A method of using the detector according to the present invention to determine the thickness of a layer of powder on a surface will now be described. An area on the surface that is coated with the layer of powder is located which has an area sufficiently large to accommodate both feet 16, 18 of the gauge 10. The gauge 10 is placed perpendicularly into the dry powder so that both of the feet 16, 18 rest firmly on the surface at the same time. Some compressed powder may lie between the substrate and the two feet 16, 18 at this time. The gauge 10 is then dragged along the surface of the coated part in a direction perpendicular to the plane in which the gauge 10 resides for a minimum distance equal to the thickness of the gauge. In one embodiment, the gauge is dragged for a minimum distance of at least ⅛ of an inch, although it may be preferable to drag the gauge for at least a distance of about ½ inch. The movement of the gauge 10 with respect to the surface allows the feet 16, 18 to burrow down through the powder and make firm contact with the surface with a minimal amount of powder between the bottom surfaces of the feet 16, 18 and the surface. In addition, the dragging of the gauge 10 along the surface enables any of the teeth that are of a sufficient length to reach the powder to leave furrow lines in the powder.

Alternatively, the gauge 10 may be set on the surface by first placing only one of the feet 16, 18 on the surface and then lowering the gauge until the other of the feet 16, 18 is firmly in contact with the substrate.

After the gauge has been placed in firm contact with the surface and dragged along the surface, as set forth above, the gauge 10 is removed from the surface, and the dry powder is examined. The dry powder is examined for furrow lines that may have been left by any of the teeth 20, 22, 24, 26, of the gauge. The furrow lines are compared to the location of the teeth on the gauge, and a determination is made as to which of the teeth were in contact with the powder. The thickness of the powder is determined to lie between the shortest tooth making a line in the powder, and the clearance of the next shorter tooth not touching the powder.

In order to verify which of the teeth made actual contact with the powder, the gauge 10 may be examined to determine which of the teeth have residual powder adhering to them. In view of the fact that the gauge 10 is preferably made from a metal such as aluminum, there will likely be some electrostatic adhesion between the powder and any of the teeth that were in contact with the powder during the movement of the gauge 10 along the surface.

For enhanced accuracy, a plurality of readings may be taken.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. A detector for measuring a thickness of a powder on a surface, comprising:

a body having a bottom edge;

two feet extending from the bottom edge of the body, each of the feet includes a flat two dimensional planar bottom surface for self-supporting the body on the surface in a direction that is predetermined with respect to the surface, wherein the flat two dimensional planar bottom surfaces of both feet reside in a same plane; and a plurality of teeth extending from the bottom edge of the body, each of the teeth forming a point at its distal end, wherein the points of the teeth end at different distances from the plane in which the flat bottoms of the feet reside.

2. The detector of claim 1, wherein the feet and teeth extend substantially in a same direction.

3. The detector of claim 1, wherein each of the teeth has a depth, and the point of the respective tooth extends along the depth of the tooth so as to form a line extending along the end of the tooth, wherein the line is perpendicular to a line interconnecting the two feet.

4. The detector of claim 1, wherein the feet support the body in a direction that is perpendicular to the surface.

5. The detector of claim 1, wherein each of the teeth has a different length.

6. The detector of claim 1, wherein the body is made of metal.

7. The detector of claim 1, wherein the body is made of aluminum.

8. The detector of claim 1, wherein the body is substantially rectangular with a thickness of about ⅛ inch.

9. A detector for measuring a thickness of a powder on a surface, comprising:

a body;

means having a flat planar bottom surface extending from the body for supporting the body on the surface such that the body extends in a plane that is substantially perpendicular to the surface; and a plurality of teeth extending from the body and spaced from each other along the plane, each of the teeth being defined by two walls extending from the body, the walls converging toward each other as the walls extend from the body so as to form a distinct line of intersection extending perpendicular to the plane at a point remote from the body, each of the teeth being of a different length such that the line of intersection of each tooth is a unique distance from the surface when the body is held against the surface via the facilitating means.

10. The detector of claim 9, wherein the plurality of teeth are spaced from each other sufficiently to prevent powder displaced from one of the plurality of teeth from contacting any other of the plurality of teeth.

11. The detector of claim 9, wherein the body is made of metal.

12. The detector of claim 9, wherein the body is made of aluminum.

13. The detector of claim 9, wherein the body is substantially rectangular with a thickness of about ⅛ inch.

14. A method of detecting a thickness of a layer of powder on a surface, comprising the steps of:

placing the detector of claim 9 on the surface such that the detector extends substantially perpendicularly to the surface;

sliding the detector along the surface in a direction that is perpendicular to the plane of the body for a distance that is greater than a thickness of the body;

examining the layer of powder on the surface in a location over which the detector was slid;

identifying which, if any, of the teeth made an imprint in the powder; and determining the thickness of the layer by the unique distance of the teeth that made an imprint in the powder.

15. The method of claim 14, wherein the sliding step includes sliding the detector a distance sufficient to enable the teeth which are of sufficient length to contact the powder to leave furrow lines in the powder.

16. The method of claim 14, wherein the sliding step includes sliding the detector a distance sufficient to enable the facilitating means to burrow through the powder and make contact with the surface.

17. The method of claim 16, wherein the sliding step includes sliding the detector a distance sufficient to enable the teeth which are of sufficient length to contact the powder to leave furrow lines in the powder.

18. The method of claim 14, further comprising the steps of examining the plurality of teeth and determining which, if any, of the plurality of teeth have powder on them in order to confirm the identification of teeth which made an imprint in the powder.

19. The method of claim 14, further comprising the step of electrostatically adhering powder to all of the teeth that make an imprint in the layer of powder.

20. The method of claim 19, further comprising the steps of examining the plurality of teeth and determining which, if any, of the plurality of teeth have powder on them in order to confirm the identification of teeth which made an imprint in the powder.

21. The detector of claim 1, wherein the point of each tooth ends at a different distance from the plane in which the flat bottoms of the feet reside.

* * * * *